Dec. 23, 1958        P. RICHARTZ        2,865,274
LENS CARRYING STRUCTURE FOR PHOTOGRAPHIC CAMERAS
Filed Aug. 24, 1955        2 Sheets-Sheet 1
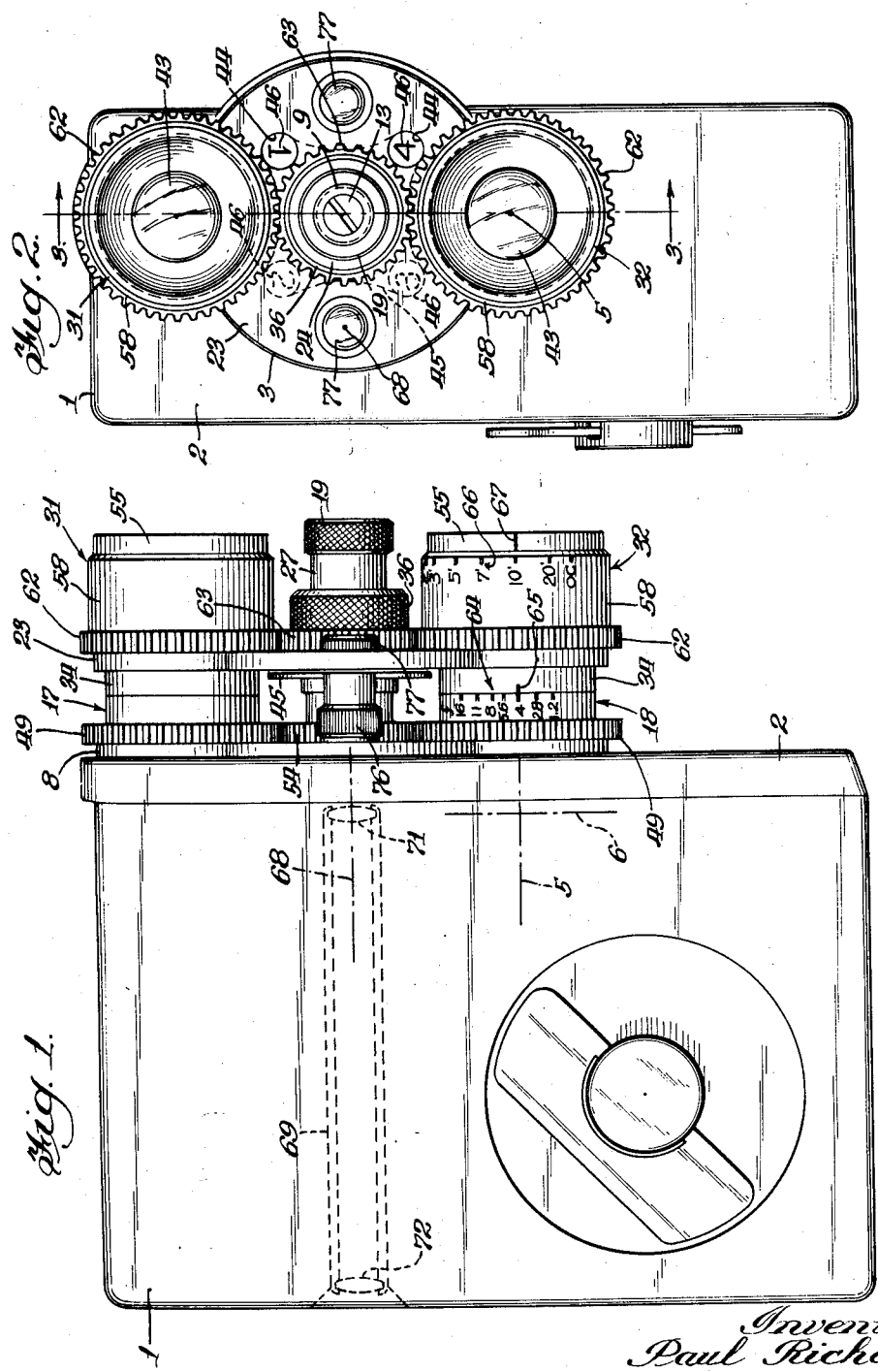

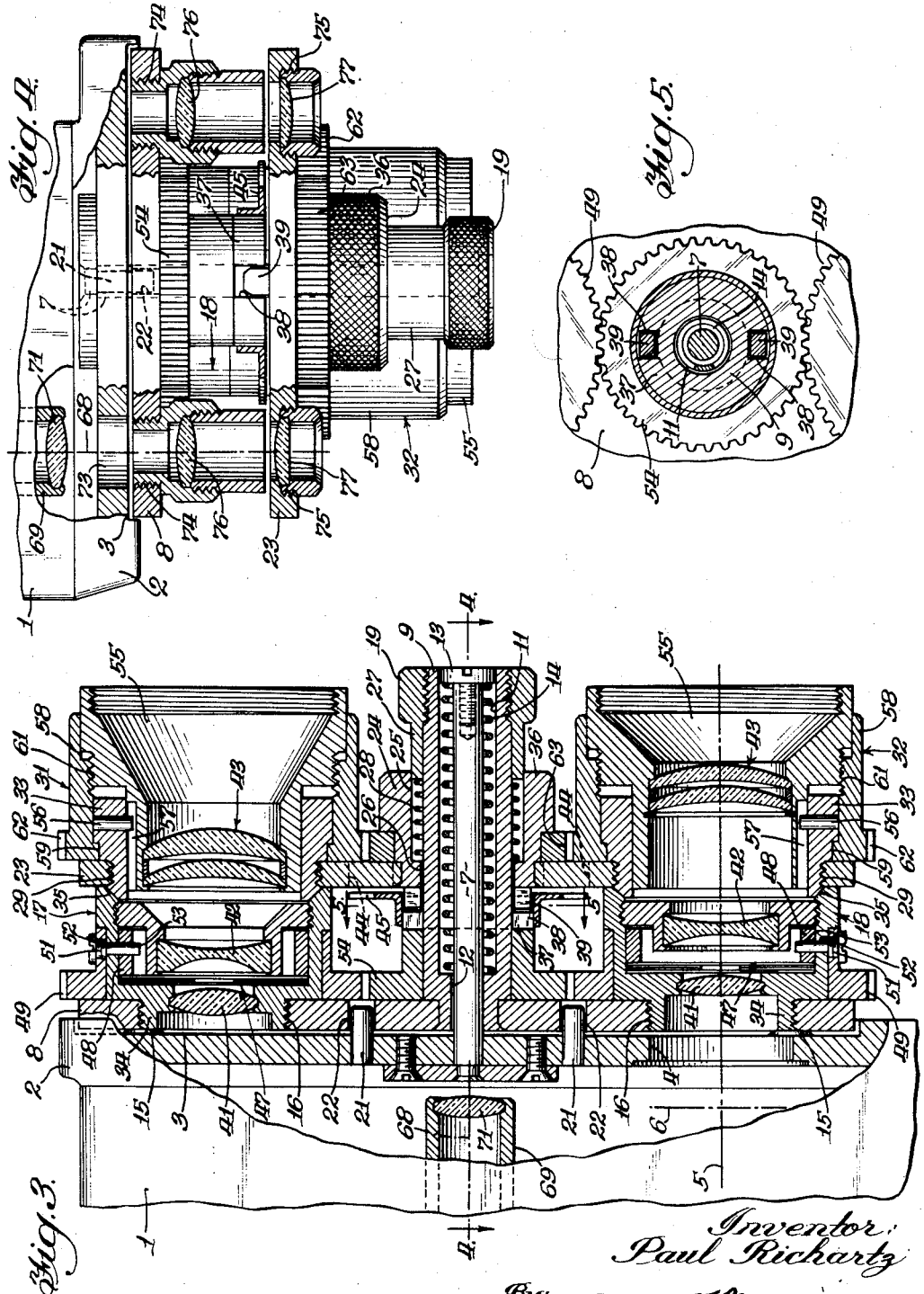

2,865,274
LENS CARRYING STRUCTURE FOR PHOTOGRAPHIC CAMERAS

Paul Richartz, Lincolnwood, Ill., assignor to Bell & Howell Company, Chicago, Ill., a corporation of Illinois Application August 24, 1955, Serial No. 530,356

3 Claims. (Cl. 95—45)

My invention relates to a lens carrying structure for photographic cameras which provides for conveniently selectively positioning lenses of different characteristics in photographing position.

The main object of the invention resides in the provision of such a lens carrying structure which is compact and convenient and which provides for selectively combining a plurality of primary lenses of different characteristics and a secondary lens or a plurality of secondary lenses of different characteristics so that a relatively great number of combined lenses of different characteristics are available.

The above object and certain other objects, hereinafter appearing, are embodied in the preferred form of the invention, hereinafter described and illustrated in the accompanying drawings forming a part hereof and in which:

Figure 1 is a side elevation of a motion picture camera embodying my invention;

Figure 2 is a front elevation of the same;

Figure 3 is a partial sectional view taken substantially on the line 3—3 of Figure 2;

Figure 4 is a partial sectional view taken substantially on the line 4—4 of Figure 3; and Figure 5 is a partial sectional view taken subtantially on the line 5—5 of Figure 3.

Referring to the drawings and particularly Figures 1, 2 and 3, a motion picture camera is generally designated at 1, and the front wall 2 of the camera is provided with a forwardly facing vertically elongated recess 3. The front wall 2 is provided with a light aperture 4 therethrough adjacent the lower end of the recess 3 and this aperture is centered with the exposure axis 5 of the camera, the focal plane of the camera being indicated at 6.

A stud 7 is secured on and projects forwardly from the front wall 2 and is disposed centrally of the recess 3 and is consequently vertically spaced above the exposure axis 5 of the camera. See Figure 2.

A centrally bored elongated inner lens carrier 8, in the form of a flat plate, is arranged forwardly of the camera and has a bored hub 9 secured centrally thereon and projecting forwardly thereof and surrounding the stud 7. The bore 11 of the hub is reduced at its rear portion as designated at 12, and the lens carrier 8 is mounted on the stud 7 for rotation and axial movement toward and away from the camera by means of the reduced rear bore portion 12 of the hub being rotatably and slidably mounted on the stud and by means of the forward portion of the hub bore 11 being rotatably and slidably mounted on the relatively large head of a screw 13 screwthreaded into the front end of the stud 7.

A helical compression spring 14 surrounds the stud 7 and is arranged within the hub bore 11, and oppositely engaging the head of the screw 13 and the shoulder formed by the reduced rear bore portion 12 of the hub 9, yieldably urges the lens carrier 8 rearwardly toward the camera. When the lens carrier 8 is in a vertical position and is in its rearward position, as shown in Figures 3 and 4, it engages in the recess 3 and forms a light trap therewith, rearward movement of the carrier being limited by stop elements 15 on the bottom of the recess adjacent the upper and lower ends thereof.

The lens carrier 8 is provided with two lens mounts 16, in the form of screwthreaded apertures, which are spaced longitudinally of the carrier in diametrically opposite equally spaced relation with the rotational axis of the carrier for the selective registration of the lens mounts with the exposure axis 5 of the camera respectively in diametrically opposite angular positions of the carrier. Two primary lenses 17 and 18 of different characteristics and respectively mounted in the lens mounts 16, are selectively registerable with the exposure axis of the camera, and the lens carrier 8 is oppositely positioned on the camera by moving the carrier forwardly against the influence of the spring 14, then rotating the carrier to its opposite position, and finally permitting the spring 14 to move the carrier rearwardly and engage it in the recess 3 of the camera. A knob 19 is secured on the forward end portion of the hub 9 to facilitate manipulation of the inner lens carrier 8.

Two registering studs 21, see Figures 3 and 4, are arranged within the recess 3 and in diametrically opposite relation with the stud 7 and are secured on the front wall of the camera and project forwardly from the bottom of the recess and slightly forward of the front face of the front wall 2 of the camera, and are engageable in similarly arranged registering apertures 22 in the lens carrier 8 when the carrier is in its rearward position and in one of its diametically opposite positions. These studs and apertures are engageable and disengageable respectively with rearward and forward movement of the lens carrier and serve as releasable registering means for positioning the lens carrier 8 on the camera with a selected lens on the carrier in registration with the exposure axis of the camera. By reason of the studs 21 projecting a slight distance forward of the front face of the camera, they prevent the lens carrier from engaging the front face of the camera as the carrier is rotated.

A centrally bored elongated outer lens carrier 23, in the form of a flat plate and conforming in configuration with the inner lens carrier 8 is arranged forwardly of the inner lens carrier in superposed relation therewith, and has a bored hub 24 secured centrally thereon and projecting forwardly thereof and surrounding the hub 9. The bore 25 of this hub is reduced at its rear portion as designated at 26, and the outer lens carrier 23 is mounted on the hub 9 of the inner lens carrier for rotation and axial movement toward and away from the inner lens carrier by means of the reduced rear bore portion 26 of the hub 24 being rotatably and slidably mounted on the hub 9 and by means of the forward portion of the bore 25 of the hub 24 being rotatably and slidably mounted on a rearward cylindrical extension 27 of the knob 19.

A helical compression spring 28 surrounds the hub 9 and is arranged within the hub bore 25, and oppositely engaging the extension 27 and the shoulder formed by the reduced rear bore portion 26 of the hub 24, yieldably urges the outer lens carrier 23 rearwardly toward the inner lens carrier 8.

The outer lens carrier 23 is provided with two lens mounts 29, in the form of threaded apertures, which are spaced longitudinally of this carrier in diametrically opposite equally spaced relation with the rotational axis of the carrier for the selective registration of these lens mounts with the exposure axis 5 of the camera and the simultaneous selective registration of these lens mounts with the lens mounts 16 of the inner lens carrier 8. Two secondary lenses 31 and 32 of different characteristics and cooperable with the primary lenses 17 and 18, and respectively mounted in the lens mounts 29, are selectively registerable with the exposure axis 5 of the camera and simultaneously selectively registerable with the primary lenses, and the rear portions of the main sleeves 33 of the secondary lenses extend rearwardly of the outer lens carrier 23 and engage within the front portions of the main sleeves 34 of the primary lenses 17 and 18, as designated at 35 in Figure 3, when the primary and secondary lenses are in registry and the outer lens carrier is positioned rearwardly, to provide light trapping between the primary and secondary lenses.

The outer lens carrier 23 is oppositely positioned on the inner lens carrier 8 by moving the outer lens carrier forwardly against the influence of the spring 28, then rotating the outer lens carrier to its opposite position, and finally permitting the spring 28 to move the outer lens carrier rearwardly and engage the main sleeves of the primary and secondary lenses. The front end portion of the outer lens carrier hub 24 is enlarged to provide a knob 36 to facilitate manipulation of the outer lens carrier 23, and the spring 28 is preferably weaker than the spring 14 so that the outer lens carrier may be manipulated without disturbing the inner lens carrier.

The inner lens carrier hub 9 is provided with an external circumferential flange 37 between the lens carriers 8 and 23 and rearwardly adjacent the lens carrier 23, see Figures 3, 4 and 5, and the collar is provided with two diametrically opposite registering slots 38. The rear end of the outer lens carrier hub 24 is provided with two diametrically opposite rearwardly projecting registering lugs 39 which are engageable in the slots 38 when the outer lens carrier 23 is in its rearward position and in one of its diametrically opposite positions. These slots and lugs are engageable and disengageable respectively with rearward and forward movement of the outer lens carrier 23 with respect to the inner lens carrier 8 and serve as releasable registering means for positioning the outer lens carrier on the inner lens carrier with the lens of the outer lens carrier in selected registration with the lenses of the inner lens carrier. The flange 37 and lugs 39 are so arranged that they prevent the rear ends of the main sleeves 33 of the secondary lenses 31 and 32 from engaging the front ends of the main sleeves 34 of the primary lenses 17 and 18 as the outer lens carrier 23 is rotated with respect to the inner lens carrier 8.

While the registering means comprising the studs 21 and the cooperating apertures 22 and the lugs 39 and the cooperating slots are preferable, it is to be noted that as an alternative the engagement of the inner lens carrier 8 in the recess 3 and the engagement of the rearwardly projecting ends of the main sleeves 33 of the secondary lenses within the front ends of the main sleeves 34 of the primary lenses, may serve as the registering means for positioning the inner lens carrier 8 on the camera and the outer lens carrier 23 on the inner lens carrier in the diametrically opposite lens registering positions thereof.

As shown, see Figure 3, the primary lenses 17 and 18 and secondary lenses 31 and 32 are complemental parts of photographic lenses of the triplet type, the primary lenses comprising rear positive components 41 and intermediate negative components 42 and the secondary lenses comprising positive front components 43 in the form of air spaced doublets cooperable with the primary lenses, the primary lenses being of different focal lengths and the secondary lenses being of different magnifications. Thus, while the arrangement, as shown, comprises the components of but two photographic lenses, the characteristics of four different photographic lenses are available, with resulting compactness and convenience.

It is to be noted that instead of the primary lenses 17 and 18 and the secondary lenses 31 and 32 being complemental parts of photographic lenses, the lenses of the inner carrier 8 may be complete photographic lenses and the lenses on the outer carrier 23 be supplementary lenses modifying the primary lenses and a supplementary lens may be omitted from one of the lens mounts of the outer carrier so that the primary lens registered therewith functions alone.

It will be noted that the primary lenses 17 and 18 may be selectively registered with the exposure axis 5 of the camera and the secondary lenses 31 and 32 may be selectively registered with the exposure axis and the selected primary lens, so that any combination of the lenses may be registered with the exposure axis, it being observed that the secondary lenses are simultaneously selectively registerable with the primary lenses, so that assuming the instant registration of the primary lenses is as desired, the resulting two combined lenses may be selectively registered with the exposure axis by manipulation of the lens carrier 8, the lens carrier 23 being carried therewith.

The lens carrier 23 is provided with two apertures 44 equidistant from the rotational axis thereof and arranged angularly of this axis at an angle of ninety degrees, see Figures 2 and 3, and a flange 45 is secured on the flange 37 of the hub 9 of the inner carrier 8 immediately to the rear of the lens carrier 23 and is provided with four forwardly facing different designations 46, shown as the numbers 1, 2, 3 and 4, arranged angularly about the rotational axis of the lens carriers at angles of ninety degrees from each other and so that they may register with the apertures 44 for observation therethrough as the lens carriers are relatively rotated.

The apertures 44 are so angularly related to the lens mounts 29 of the outer lens carrier 23 and the designations 46 are so angularly related to the lens mounts 16 of the inner lens carrier 8 that different pairs of the designations register with the apertures in the diametrically opposite lens registering positions of the outer lens carrier with respect to the inner lens carrier and so designate the different combinations of the primary and secondary lenses. Consequently, the desired primary and secondary lens registration and the registration of the desired primary and secondary lens combination with the exposure axis may be readily effected.

The primary lenses 17 and 18, see Figure 3, are provided with usual adjustable diaphragms 47 which as shown are of the usual multi leaf type and comprise adjusting rings 48 respectively mounted within the main sleeves 34 of the primary lenses for angular movement about the axes of the lenses to effect the diaphragm adjustment. Ring gears 49 are respectively mounted on the exteriors of the main sleeves 34 of the primary lenses for rotation about the axes of these lenses, and are respectively connected with the adjusting rings 48 for adjusting the diaphragms with angular movement thereof by screw studs 51 screwthreaded into the ring gears and projecting radially inward therefrom through angular slots 52 through the main sleeves 34 and engaging in radial apertures 53 through the adjusting rings 48. A bored intermediate gear 54 is rotatably mounted on the hub 9 rearwardly of the outer lens carrier 23 and between the inner lens carrier 8 and the flange 37, and meshes with the ring gears 49 for the convenient simultaneous adjustment of the diaphragms 47.

The secondary lenses 31 and 32, see Figure 3, are provided respectively with usual adjustable focusing means whereby the combined lenses may be focused with respect to the exposure plane of the camera. These focusing means comprise sleeves 55 respectively carrying the secondary lens components 43 and respectively mounted for axial movement within the main sleeves 33 of the secondary lenses and held against rotation by inwardly projecting radial pins 56 mounted on the main sleeves and slidably engaged in keyways 57 of the sleeves 55, and focus adjusting sleeves 58 respectively rotatably mounted on the exterior of the main sleeves 33 and held against axial movement thereon, as designated at 59, and respectively screwthreaded on the sleeves 55, as designated at 61, to effect axial focusing adjustment of the lens component carrying sleeves 55 with angular movement of the focus adjusting sleeves 58 about the axes of the secondary lenses.

The focus adjusting sleeves 58 are provided with gears 62, and a bored intermediate gear 63 is rotatably mounted on the hub 24 immediately forward of the lens carrier 23 and meshes with the gears 62 for the convenient simultaneous focus adjustment of the secondary lens components 43, the pitches of the focusing screwthreads 61 being different to compensate for the difference in the focusing adjustment of the secondary lens components 43.

Thus, both the diaphragms and the focus of the combined lenses are respectively conveniently simultaneously adjustable. The adjustment of the diaphragms, see Figure 3, is indicated by a diaphragm opening scale 64 on one of the gears 49 and a cooperating index mark 65 on the associated main lens sleeve 34, and the focusing adjustment of the secondary lenses is indicated by a focusing scale 66 on one of the focus adjusting sleeves 58 and cooperating with an index mark 67 on the associated sleeve 55.

The camera 1 is provided with a view finder means, see Figures 1 and 4, providing a view finder axis 68 spaced from the exposure axis 5 and spaced horizontally from the rotational axis of the lens carriers, and comprising a view finder tube 69 extending rearwardly and forwardly within the camera, a field lens 71 arranged in the front end of the tube, and an eye lens 72 arranged in the rear end of the tube, the eye lens being exposed at the rear of the camera for viewing and the front wall 2 of the camera being provided with a light aperture 73 therethrough which is centered with the view finder axis.

The lens carrier 8 is provided with two view finder lens mounts 74, in the form of screwthreaded apertures, which are spaced transversely of the lens carrier in diametrically opposite equally spaced relation with the rotational axis of the lens carriers for the selective registration of the view finder lens mounts simultaneously with the selective registration of the primary lens mounts 16 with the exposure axis 5, and the lens carrier 23 is provided with two view finder lens mounts 75 which are spaced transversely of this lens carrier in diametrically opposite equally spaced relation with the rotational axis of the lens carriers for the simultaneous selective registration of the view finder mounts 75 with the view finder lens mounts 74 simultaneously with the simultaneous selective registration of the secondary lens mounts 29 with the primary lens mounts 16.

Two view finder lenses 76, corresponding respectively with the primary lenses 17 and 18, are respectively mounted on the lens mounts 74 of the lens carrier 8, so that corresponding of these view finder and primary lenses are simultaneously selectively respectively with the view finder and exposure axes 68 and 5, and two view finder lenses 77, corresponding respectively with the secondary lenses 31 and 32, are respectively mounted in the lens mounts 75 of the lens carrier 23, so that corresponding of these view finder and secondary lenses are simultaneously selectively registerable respectively with the view finder lenses 76 and the primary lenses 17 and 18. Consequently, as a selected primary and secondary lens combination is registered with the exposure axis 5, the corresponding view finder lens combination is registered with the view finder axis 68, so that the scene viewed through the view finder corresponds with the image formed by the primary and secondary lens combination at the exposure plane 6 of the camera.

While I have thus described my invention, I do not wish to be limited to the precise details described, as changes may be made without departing from the teaching of my invention.

I claim:

1. The combination with a photographic camera, of a stud mounted on said camera and projecting forwardly therefrom in spaced relation with the exposure axis of said camera, a centrally bored inner lens carrier mounted on said stud for rotation and axial movement and the bearing between said inner carrier and stud comprising an axial forwardly projecting bored hub on said inner carrier and surrounding said stud, a centrally bored outer lens carrier arranged forwardly of said inner carrier and mounted on said hub for rotation and axial movement and the bearing between said outer carrier and hub comprising an axial forwardly projecting bored hub on said outer carrier and surrounding said first mentioned hub, said carriers being provided with equal pluralities of lens mounts uniformly spaced radially of and angularly about the axes of said carriers for the selectively positioning thereof in registration with said exposure axis and the simultaneous registration of the lens mounts of one carrier with those of the other, a plurality of primary lenses of different focal lengths respectively mounted on the lens mounts of said inner carrier, a plurality of secondary lenses of different magnifications and cooperable with said primary lenses and respectively mounted on the lens mounts of said outer carrier, cooperating registering elements respectively on said camera and inner carrier for selectively positioning said inner carrier on said camera with any of the inner carrier lens mounts in registration with said exposure axis and engageable and disengageable respectively with axial movement of said inner carrier toward and away from said camera, cooperating registering elements respectively on said inner and outer carriers for selectively positioning said outer carrier on said inner carrier with a selected outer carrier lens mount in registration with a selected inner carrier lens mount and engageable and disengageable respectively with axial movement of said outer carrier toward and away from said inner carrier, and helical compression spring means associated with said stud and hubs in coaxial relation therewith for yieldably urging said carriers axially toward said camera.

2. The combination of claim 1 and further comprising said spring means comprising a helical compression spring surrounding said stud and arranged within said first mentioned hub and operative between said stud and inner carrier to yieldably urge said inner carrier toward said camera and a helical compression spring weaker than said first mentioned spring and surrounding said first mentioned hub and arranged within said second mentioned hub and operative between said first mentioned hub and outer carrier to yieldably urge said outer carrier toward said inner carrier.

3. The combination of claim 1 and further comprising said primary lenses being provided respectively with adjustable diaphragm means comprising diaphragm adjusting members respectively angularly movable about the axes of said primary lenses, a gear train connecting said diaphragm adjusting members for simultaneously actuating the same and comprising a bored intermediate gear mounted for rotation on said hub of said inner carrier rearwardly of said outer carrier, said secondary lenses being provided with respectively with adjustable focusing means comprising focus adjusting members respectively angularly movable about the axes of said secondary lenses, and a gear train connecting said focus adjusting members for simultaneously actuating the same and comprising a bored intermediate gear mounted for rotation on said hub of said outer carrier.

References Cited in the file of this patent

UNITED STATES PATENTS

| | | |
|---|---|---|
| 1,804,691 | Hunsicker | May 12, 1931 |
| 1,859,207 | Howell | May 17, 1932 |
| 1,945,940 | Hunsicker | Feb. 6, 1934 |
| 2,482,571 | Arnold | Sept. 20, 1949 |
| 2,510,360 | Zuber | June 6, 1950 |

FOREIGN PATENTS

| | | |
|---|---|---|
| 379,653 | France | Sept. 13, 1907 |
| 531,524 | France | Oct. 26, 1921 |
| 378,749 | Germany | July 31, 1923 |
| 861,050 | Germany | Dec. 29, 1952 |